US008473013B2

(12) United States Patent  (10) Patent No.: US 8,473,013 B2
Jia et al.  (45) Date of Patent: Jun. 25, 2013

(54) MULTI-LEVEL DUTY CYCLING

(75) Inventors: Zhanfeng Jia, Belmond, CA (US); David Jonathan Julian, San Diego, CA (US); Chong U. Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1437 days.

(21) Appl. No.: 12/118,376

(22) Filed: May 9, 2008

(65) Prior Publication Data

US 2009/0270030 A1 Oct. 29, 2009

Related U.S. Application Data

(60) Provisional application No. 61/047,189, filed on Apr. 23, 2008.

(51) Int. Cl.
*H04B 1/38* (2006.01)
*H04B 7/00* (2006.01)
*H04B 1/16* (2006.01)

(52) U.S. Cl.
USPC .......................... 455/572; 455/515; 455/343.1

(58) Field of Classification Search
USPC .................. 455/572–574, 343.1–343.5, 515, 455/450
See application file for complete search history.

(56) References Cited

U.S. PATENT DOCUMENTS

| 4,814,742 A | * | 3/1989 | Morita et al. | 340/10.31 |
| 5,606,728 A | * | 2/1997 | Keba et al. | 340/7.35 |
| 5,687,169 A |   | 11/1997 | Fullerton | |
| 5,764,696 A |   | 6/1998 | Barnes et al. | |
| 5,812,081 A |   | 9/1998 | Fullerton | |
| 5,832,035 A |   | 11/1998 | Fullerton | |
| 5,907,427 A |   | 5/1999 | Scalora et al. | |
| 5,941,989 A | * | 8/1999 | Klein | 713/300 |
| 5,952,956 A |   | 9/1999 | Fullerton | |
| 5,960,031 A |   | 9/1999 | Fullerton et al. | |
| 5,963,581 A |   | 10/1999 | Fullerton et al. | |
| 5,969,663 A |   | 10/1999 | Fullerton et al. | |

(Continued)

FOREIGN PATENT DOCUMENTS

EP 0627836 12/1994
EP 1473951 A2 11/2004

(Continued)

OTHER PUBLICATIONS

International Search Report—PCT/US08/063476, International Search Authority—European Patent Office, Feb. 26, 2009.

(Continued)

*Primary Examiner* — Kent Chang
*Assistant Examiner* — Scott Au
(74) *Attorney, Agent, or Firm* — Paul S. Holdaway

(57) ABSTRACT

A duty cycle scheme for wireless communication employs three or more duty cycle levels. In some aspects, a wireless device may continually scan for signals in an active state associated with a first duty cycle, periodically scan for signals during a periodic state associated with a second duty cycle, and periodically scan for signals during a standby state associated with a third duty cycle. Here, the second duty cycle may be lower than the first duty cycle and the third duty cycle may be lower than the second duty cycle. In some aspects the timing of different states may be correlated. In some aspects each wireless device in a system may independently control its duty cycle states.

67 Claims, 11 Drawing Sheets

U.S. PATENT DOCUMENTS

| | | |
|---|---|---|
| 5,995,534 A | 11/1999 | Fullerton et al. |
| 6,031,862 A | 2/2000 | Fullerton et al. |
| 6,091,374 A | 7/2000 | Barnes |
| 6,111,536 A | 8/2000 | Richards et al. |
| 6,133,876 A | 10/2000 | Fullerton et al. |
| 6,177,903 B1 | 1/2001 | Fullerton et al. |
| 6,218,979 B1 | 4/2001 | Barnes et al. |
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |
| 6,333,669 B1 | 12/2001 | Kobayashi et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,434,376 B1 | 8/2002 | Black |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,020,701 B1 | 3/2006 | Gelvin et al. |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 2003/0210658 A1* | 11/2003 | Hernandez et al. ............ 370/311 |
| 2004/0132425 A1 | 7/2004 | Kang et al. |
| 2006/0119508 A1* | 6/2006 | Miller ...................... 342/357.17 |
| 2006/0199534 A1 | 9/2006 | Smith |
| 2007/0127425 A1 | 6/2007 | Keidar et al. |
| 2007/0162582 A1 | 7/2007 | Belali et al. |
| 2007/0248114 A1 | 10/2007 | Jia et al. |
| 2008/0008510 A1 | 1/2008 | Lee et al. |
| 2008/0014981 A1* | 1/2008 | Venkatachalam ............. 455/528 |
| 2009/0061781 A1* | 3/2009 | Zhang .......................... 455/66.1 |
| 2009/0109990 A1* | 4/2009 | Calcev et al. ................. 370/445 |

FOREIGN PATENT DOCUMENTS

| | | |
|---|---|---|
| EP | 1613107 | 1/2006 |
| JP | 2007043331 A | 2/2007 |
| JP | 2009540752 A | 11/2009 |
| RU | 2156544 C2 | 9/2000 |
| WO | WO9534178 A1 | 12/1995 |
| WO | WO2004047474 A1 | 6/2004 |
| WO | 2007149993 | 12/2007 |

OTHER PUBLICATIONS

Written Opinion—PCT/US08/063476, International Search Authority—European Patent Office, Feb. 26, 2009.
Taiwan Search Report—TW097118250—TIPO—Aug. 19, 2012.

* cited by examiner

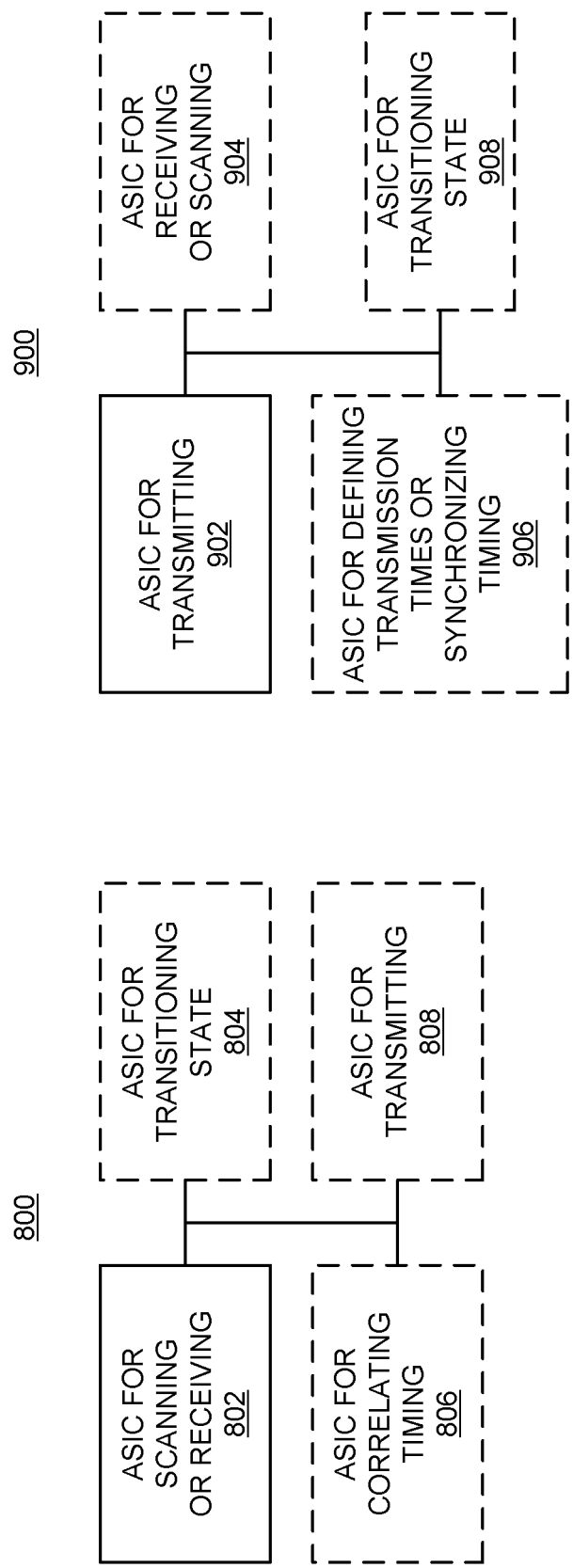

MULTI-LEVEL DUTY CYCLING

CLAIM OF PRIORITY UNDER 35 U.S.C. §119

This application claims the benefit of and priority to commonly owned U.S. Provisional Patent Application No. 61/047,189, filed Apr. 23, 2008, the disclosure of which is hereby incorporated by reference herein.

BACKGROUND

1. Field

This application relates generally to wireless communication and more specifically, but not exclusively, to communication employing multiple duty cycle levels.

2. Introduction

Wireless communication systems may be designed to support various end uses. To support such uses, one or more tradeoffs may be made in the implementation of a given system in terms of power consumption, latency, channel interference, channel usage, and other system parameters. For example, some networks may be used to provide connectivity for battery operated devices (e.g., a device that is relatively small and/or portable).

In some aspects, it is desirable to reduce the power consumption of such devices. For example, a device that consumes less power may utilize a smaller battery. Consequently, the device may potentially be manufactured in a smaller form factor and at a lower cost. In addition, a device that consumes less power may require less frequent battery recharges or battery replacements. In this case, the device may be more convenient for a user to use and may provide a lower overall cost of ownership.

Some types of networks (e.g., IEEE 802.15.1 and 802.15.4) may support power-down strategies that enable a device to reduce its overall power consumption. Here, if a device is no longer transmitting or receiving packets, the device may power down certain portions of the device (e.g., the radio) for a period of time.

In some cases, a receiving device may awake from a low power state at regular scan intervals to determine whether a transmitting device is attempting to transmit data. The receiving device may scan for a defined scan time that shorter than the duration of the scan interval. The ratio of the scan time over the scan interval may be referred to as the duty cycle of the low power state.

The transmitting device may remain in its low power state until it has a packet to send. When there is a packet to send, the transmitting device pages the receiving device to initiate transmission of the packet. Here, the transmitting device may repeatedly transmit a paging message to ensure that the receiving device receives the paging message during one of the receiving device's low power scans.

Upon receipt of a paging message, the receiving device may send a response to the transmitting node whereby both devices move to an active state. During the active state the receiving device continuously scans for incoming packets (i.e., the duty cycle is 100%). If there are no packet exchanges for a defined period of time (e.g., a timeout period), the transmitting and receiving nodes return to the low power state.

In some aspects, the duration of the timeout period is a tradeoff between latency and duty cycling. If the timeout period is long, the receiving device may waste power scanning for packets. For example, a relatively large amount of power may be wasted when supporting low data rate applications or when there are a relatively large number of paging false alarms. On the other hand, if the timeout period is short, the longer low power scan interval tends to dominate the latency. Moreover, a short timeout period may not effectively accommodate exponential back-offs associated with congestion control.

SUMMARY

A summary of sample aspects of the disclosure follows. It should be understood that any reference to the term aspects herein may refer to one or more aspects of the disclosure.

The disclosure relates in some aspects to a low duty cycle scheme that may be used to improve the performance of devices that communicate via wireless packet channels or that communicate in some other manner. In some aspects, such a scheme may facilitate lower power consumption without significantly impacting communication performance (e.g., latency). In some aspects, such a scheme may be employed in personal area networks, body area networks, or other types of networks that employ ultra-wideband technology or other technology (e.g., narrowband technology).

The disclosure relates in some aspects to a duty cycle scheme employing three or more duty cycle levels. For example, one duty cycle may be associated with an active state, a lower duty cycle associated with a periodic state, and a still lower duty cycle associated with a standby state. In some aspects, a wireless device may continually scan for signals (e.g., data packets) in the active state, periodically scan for signals (e.g., data packets) during the periodic state, and periodically scan for signals (e.g., paging messages) during the standby state. In some aspects the timing of different states may be correlated. For example, scan times during the standby state may be synchronized to scan times during the periodic state and/or the active state.

The disclosure relates in some aspects to a duty cycle scheme where each wireless device in a system may independently control its duty cycle states. Here, a first device may change to another duty cycle state based on decisions made at that device rather than changing states based on control messages received from a second device that instruct the first device to change states. For example, a receiving device may independently define its duty cycle state based on whether and when it receives signals. In addition, a transmitting device may independently define its duty cycle state based on whether or when the transmitting device transmits signals to and receives response signals from an associated receiving device.

BRIEF DESCRIPTION OF THE DRAWINGS

These and other sample aspects of the disclosure will be described in the detailed description and the appended claims that follow, and in the accompanying drawings, wherein:

FIGS. 8 and 9 are simplified block diagrams of several sample aspects of apparatuses configured to provide multi-level duty cycling as taught herein.

Figure 1:
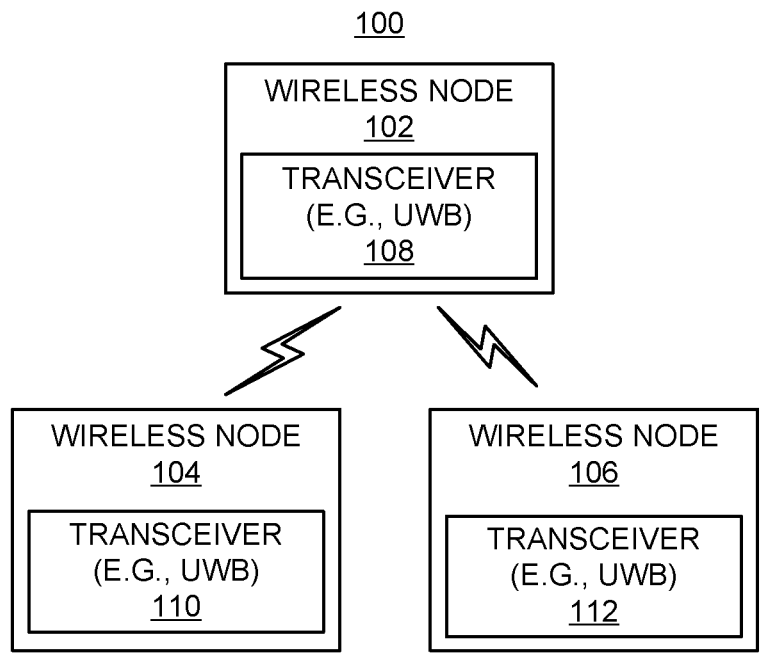
FIG. 1 is a simplified block diagram of several sample aspects of a wireless communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects a method of wireless communication comprises: scanning a channel according to a first duty cycle during a first operational state; scanning the channel according to a second duty cycle during a second operational state, wherein the second duty cycle is lower than the first duty cycle; and scanning the channel according to a third duty cycle during a third operational state, wherein the third duty cycle is lower than the second duty cycle. In addition, in some aspects the first operational state comprises an active state, the second operational state comprises a periodic state, and the third operational state comprises a standby state.

For illustration purposes, the discussion that follows describes various nodes, components, and operations of a wireless system where one wireless node sends packets to and receives packets from one or more other wireless nodes. It should be appreciated that the teachings herein also may be applicable to other types of nodes, other types of devices, other types of communication systems, and other types of traffic (e.g., transmission of signals that do not comprise packets).

FIG. 1 illustrates several sample aspects of a wireless communication system 100. For purposes of explanation, the system 100 is depicted as including several wireless nodes 102, 104 and 106. It should be appreciated that such a system may, in practice, include a different number of nodes.

A given wireless node may associate with one or more other nodes to receive and/or transmit one or more traffic flows over one or more communication channels. To this end, each wireless node may comprise at least one antenna and associated wireless communication components. In the example of FIG. 1, the nodes 102, 104, and 106 include transceivers 108, 110, and 112, respectively (e.g., ultra-wide-band transceivers). It should be appreciated that such nodes may employ different types of transceivers in different implementations.

In some implementations two or more of the nodes 102, 104, and 106 may communicate with one another using a peer-to-peer network topology. For example, each of the nodes 102, 104, and 106 may incorporate the same or substantially similar media access control functionality for accessing communication media. Moreover, the nodes 102, 104, and 106 may access the media without the use of a coordinator, a central controller, or other similar functionality. For example, a pair of peer nodes may establish a channel and send data over the channel without coordinating with (e.g., obtaining permission from) any other device.

When a given node (e.g., node 102) is within a coverage area of another node (e.g., node 104), the nodes may establish communication with one another by initially communicating over a known channel. For example, each node may be assigned a common channel on which it regularly scans for (e.g., enables its receiver to detect) signals from neighboring devices. In addition, a system-wide common channel may be defined whereby all nodes in the system may regularly scan the channel.

A channel may be defined in various ways. For example, in an pulse-based system (e.g., an ultra-wideband system), a channel may be defined by selecting one or more of a pulse repetition period, a pulse delay, a time hopping sequence, or some other parameter. In some aspects, different sets of nodes (e.g., neighboring sets of nodes) may attempt to define channels that are orthogonal or pseudo-orthogonal with one other. In this case, the different sets of nodes may determine the channel parameters (e.g., pulse timing) used by the other sets by monitoring signaling from the other sets, by receiving timing information from the other sets, or by obtaining parameter-related information in some other manner. In this way, each set of nodes may define its channel parameters in a manner that mitigates potential interference with any neighboring sets of nodes.

In the discussion that follows the term receiving node may be used to refer to a wireless node that is performing operations relating to receiving (e.g., over a given channel) and the term transmitting node may be used to refer to a wireless node that is performing operations relating to transmitting (e.g., over a given channel). Such a reference does not imply that the wireless node is incapable of performing both transmit and receive operations.

In some aspects, a given node may employ a multi-level duty cycling scheme whereby the node may enter a lower duty cycle state to save power when it is not transmitting or receiving packets. For example, in a receive-centric media access control scheme, a transmitting node may be configured to remain in a low power state until it has data to transmit while a receiving node may be configured to repeatedly scan for any transmissions from the transmitting node. In such a case, a receiving node may consume a relatively significant amount of power whenever it is scanning for packets. This scanning may be particularly inefficient from a power consumption perspective during those times that the transmitter is not transmitting data or is transmitting very little data. As discussed below, a multi-level duty cycling scheme may be employed to reduce the amount of time the receiving node scans when the traffic activity is low while enabling efficient data transfers when the traffic activity is high.

Figure 2:
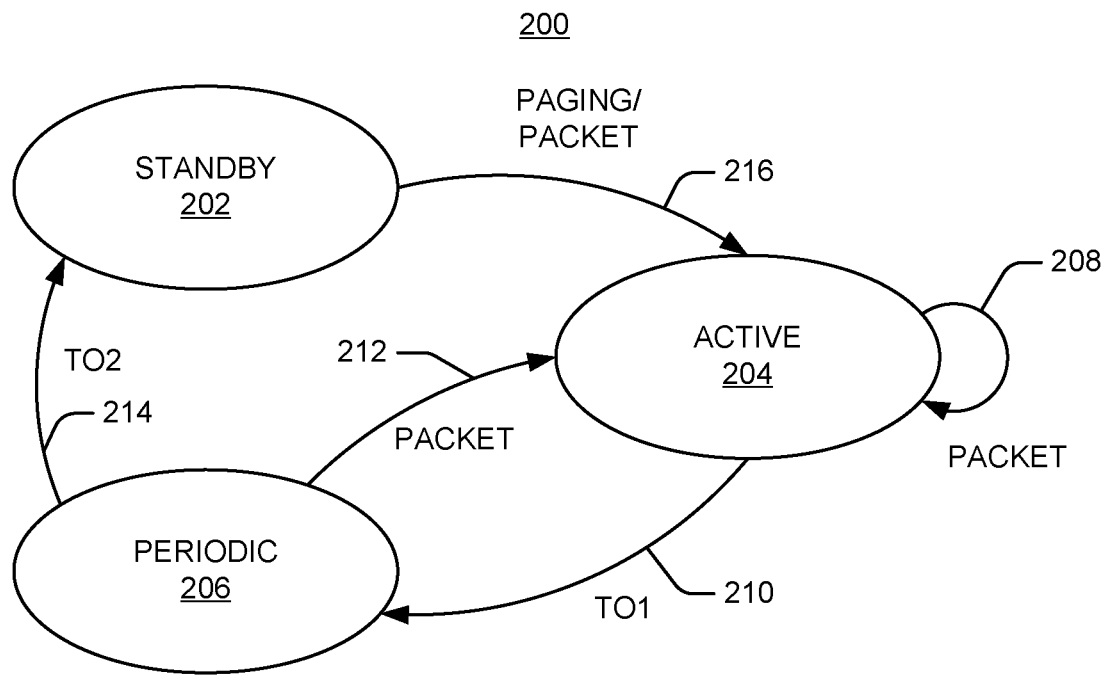
FIG. 2 is a simplified state diagram illustrating several sample aspects of a three level duty cycle scheme.
Figure 3:
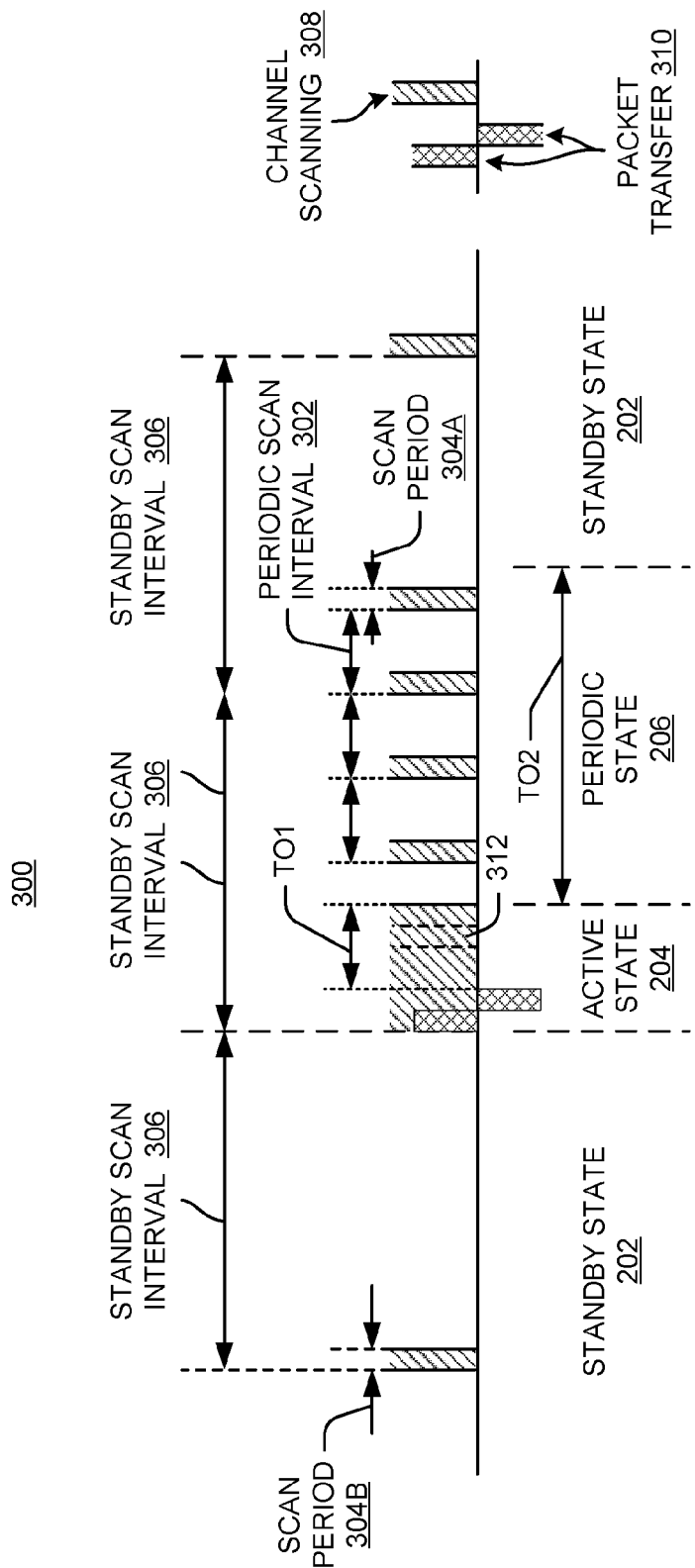
FIG. 3 is a simplified timing diagram illustrating several sample aspects of a three level duty cycle scheme.

FIGS. 2 and 3 respectively illustrate state transitions 200 and timing 300 of a sample three level duty cycle scheme. As illustrated by FIG. 2, at a given point in time a node may operate in a standby state 202, an active state 204, or a periodic state 206. As illustrated by FIG. 3, a receiving node may scan (e.g., as indicated by hatched areas 308) according to a first duty cycle during the active state 204, according to a second duty cycle during the periodic state 206, and according to a third duty cycle during the standby state 202. Here, the second duty cycle may be lower than the first duty cycle and the third duty cycle may be lower than the second duty cycle.

For example, the receiving node may continually scan a designated channel in the active state 204. Here, continual scanning may involve continuously scanning (e.g., 100% duty cycle) or scanning according to a scanning interval (e.g., every 250 µs). As represented by a line 208 in FIG. 2, a transmitting or receiving node may remain in the active state 204 as long as there is packet transfer activity (e.g., activity relating to the reception or transmission of packets) within a timeout period TO1 (e.g., 1 ms) depicted in FIG. 3. In FIG. 3, packet transfer is indicated by cross-hatched areas 310 (e.g., where packet reception and packet transmission are indicated above and below the horizontal line, respectively). In the event no packets are transferred for a period of time greater than or equal to TO1, the node transitions to the periodic state 206 as represented by a line 210 in FIG. 2.

In the periodic state 206, a receiving node scans the designated channel at times defined by a periodic scan interval 302 (e.g., 10 ms) and for a length of time defined by a scan period 304A. Here, it may be observed that the second duty cycle associated with the interval 302 and the scan period 304A is lower than the first duty cycle. If a control message or data is transferred during a scan period of the periodic state 206, a transmitting or receiving node may transition back to the active state 204 as represented by a line 212 in FIG. 2. However, if a control message or data is not transferred for a period of time greater than or equal to a timeout period TO2 (e.g., 40 ms) depicted in FIG. 3, the node transitions to the standby state 202 as represented by a line 214 in FIG. 2.

In the standby state 202, the receiving node scans the designated channel at times defined by a standby scan interval 306 (e.g., 100 ms to 1 s) and for a length of time defined by a scan period 304B. In some cases, the scan period 304B may be equal to the scan period 304A. Here, it may be seen that the third duty cycle associated with the interval 306 and the scan period 304B is lower than the second duty cycle. As will be described below, a transition from the standby state 202 to the active state 204 may occur as a result of the transfer of a control message (e.g., a paging-related message) or data (e.g., a data packet) as represented by a line 216 in FIG. 2. Also, a transmitting or receiving node may enter the standby state 202 upon power-up, after reset, after establishing a channel, or under other circumstances.

In some aspects the duration of any scan intervals associated with the active state, the periodic state, or the standby state may be based on various operational parameters. For example, in some aspects a scan time interval may be based on the size of a packet preamble. For example, the scan interval may be shorter than the preamble sequence to help ensure that the preamble may be detected by at least one scan. In some aspects a scan time interval may be selected to accommodate expected clock drift (e.g., relative clock drift of a transmitter and an associated receiver). In some aspects, a scan time interval may be based on a probability of whether a received packet will be detected or missed. For example, a receiving node that desires high quality of service may select a conservative scan interval to reduce the likelihood that it will not detect an inbound packet.

As will be discussed in more detail below, in some aspects one or more of the timeout periods TO1 and TO2 may relate to a number of scans as opposed to a defined period of time. For example, at a receiving node, a timeout may occur if a message or data is not received for a defined number of scans.

As mentioned above, the teachings herein are not limited to packet traffic. For example, in some aspects the state transitions of FIG. 2 may be based on whether signals (as opposed to packets) are received. Thus, the state transition represented by line 216 may result from the receipt or transmission of a signal. The state transition represented by line 212 may result from the receipt or transmission of a signal. The state flow represented by line 208 may result from the receipt or transmission of a signal. The state transition represented by line 210 may result from the lack of receipt or transmission of a signal (e.g., over a defined period of time or a defined number of scans). The state transition represented by line 214 may result from the lack of receipt or transmission of a signal (e.g., over a defined period of time or a defined number of scans).

The above-mentioned signal may take various forms. For example, in some aspects such a signal may comprise a bit sequence. This, in some aspects, such a signal may comprise at least a portion of a paging message, an acknowledgement message, a discovery message, a control message, a packet, a data packet, a control packet, or some other type of communication signaling. Also in some aspects a signal may comprise a response signal. In this case, the response signal may comprise, for example, a response to paging message, a response to discovery message, a response to a control message, or an acknowledgement message.

Sample operations relating to transitions between states and timing associated with these states will now be discussed in more detail in conjunction with the flowcharts of FIGS. 4A-5C. For convenience, the operations of these figures (or any other operations discussed or taught herein) may be described as being performed by specific components (e.g., components of a system 600 depicted in FIG. 6). It should be appreciated, however, that these operations may be performed by other types of components and may be performed using a different number of components. It also should be appreciated that one or more of the operations described herein may not be employed in a given implementation.

Figure 4A:
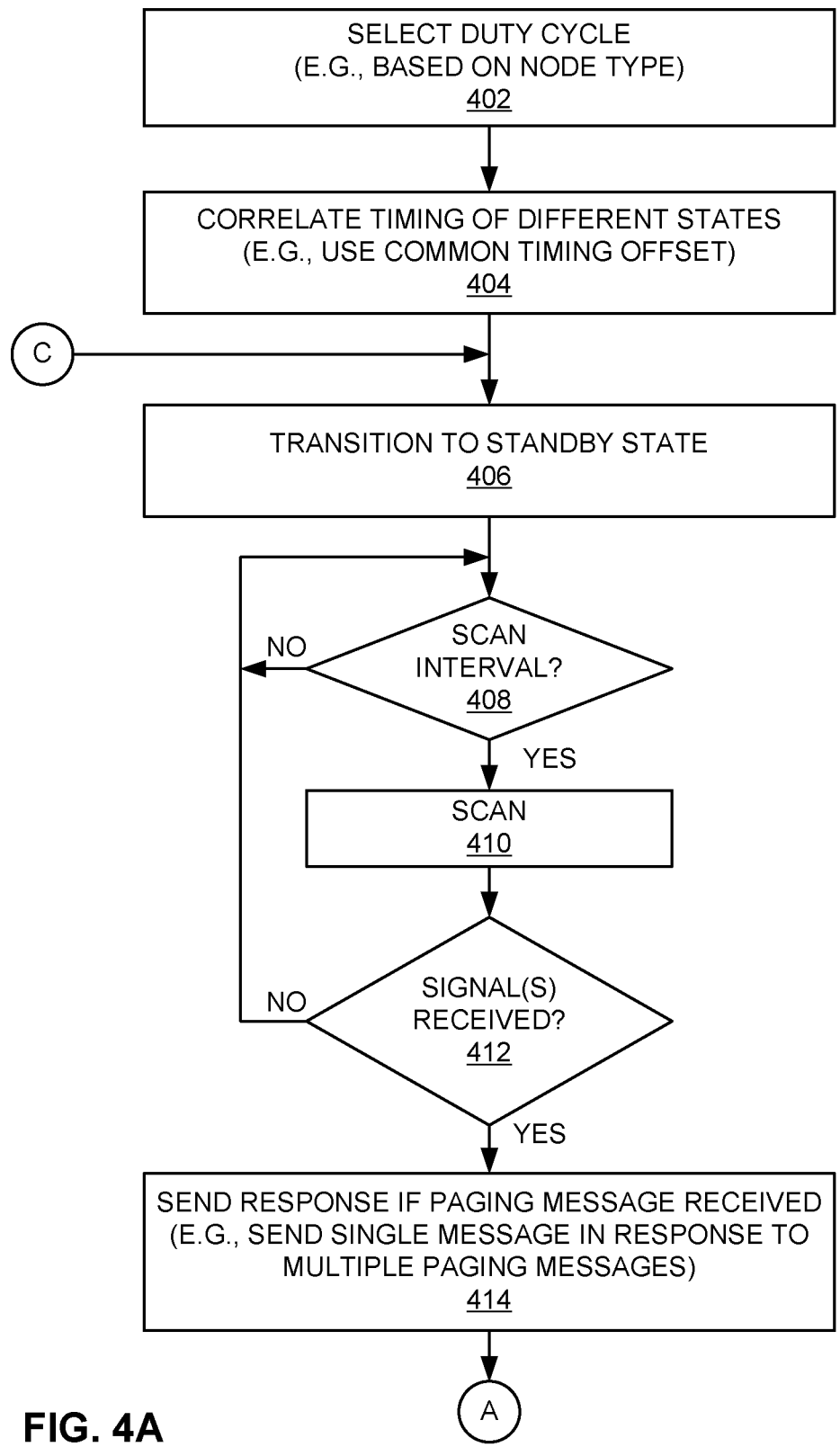
FIGS. 4A, 4B and 4C are a flowchart of several sample aspects of duty cycle operations that may be performed by a receiving node.
Figure 4B:
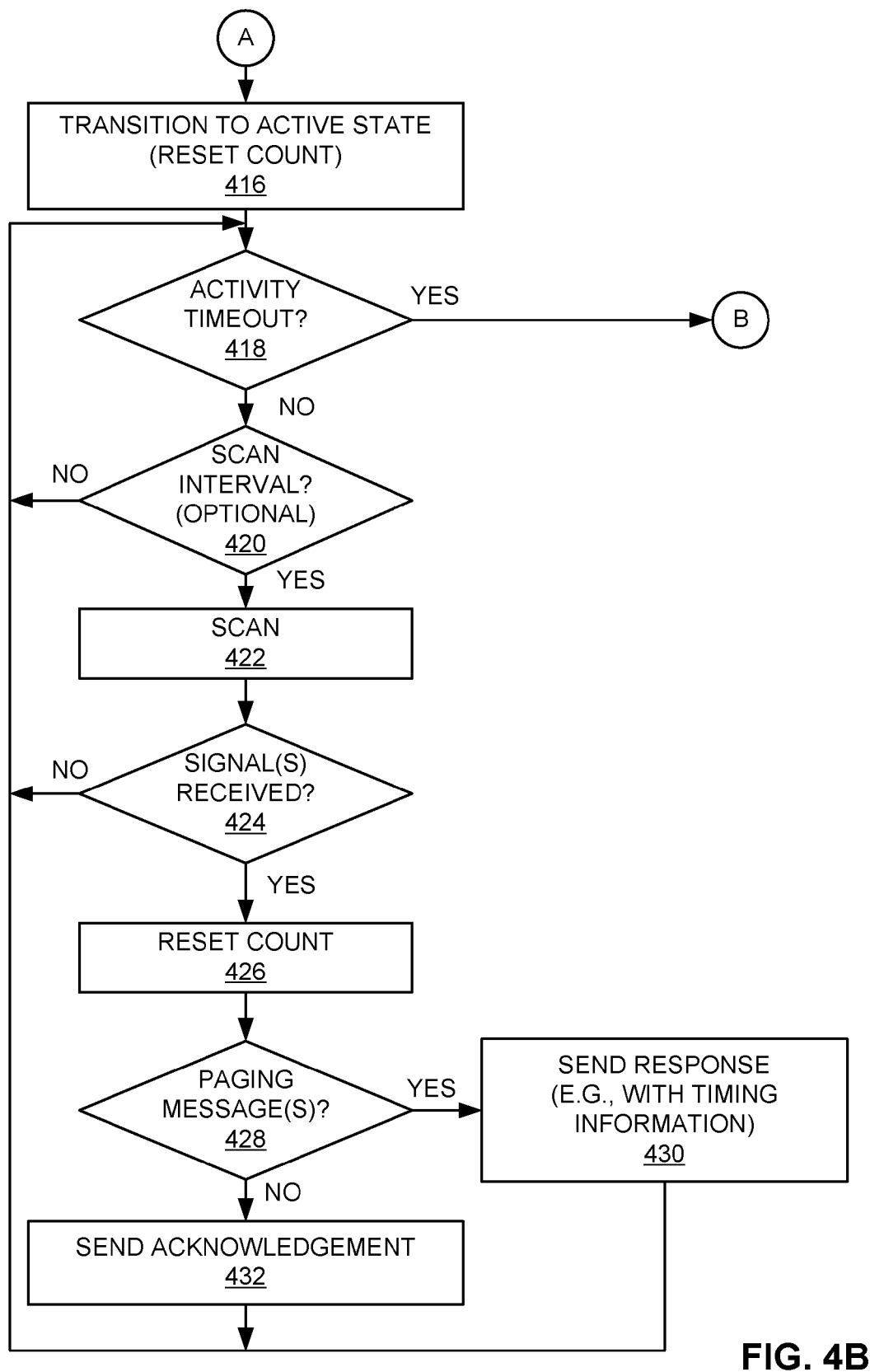
Figure 4C:
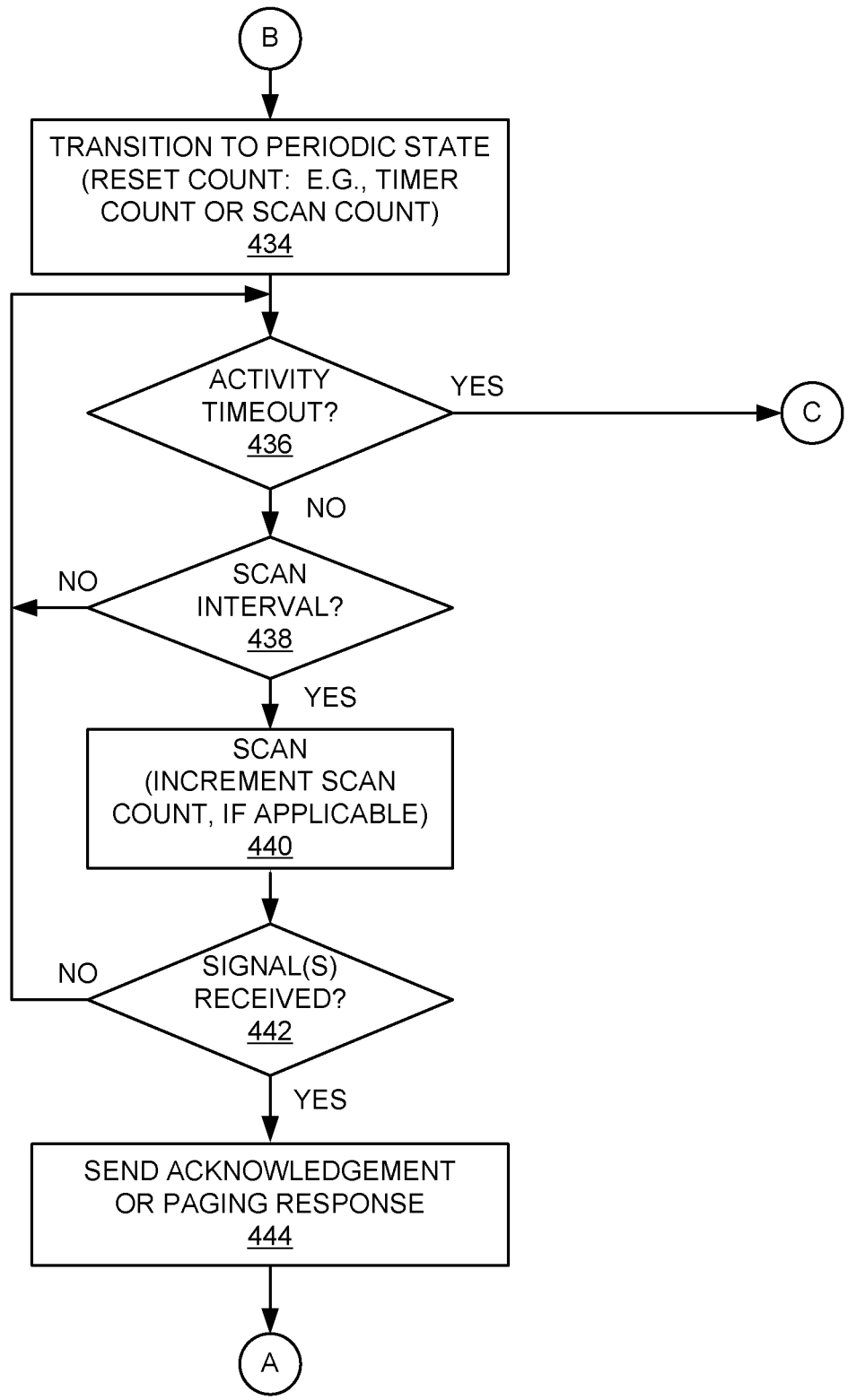

FIGS. 4A-4C describe various operations that a receiving node may perform. In particular, blocks 402-404 of FIG. 4A relate to several operations that a receiving node may perform to define state timing. Blocks 406-414 of FIG. 4A relate to operations that a receiving node may perform in a standby state. Blocks 416-432 of FIG. 4B relate to operations that a receiving node may perform in an active state. Blocks 434-444 of FIG. 4C relate to operations that a receiving node may perform in a periodic state.

Figure 5A:
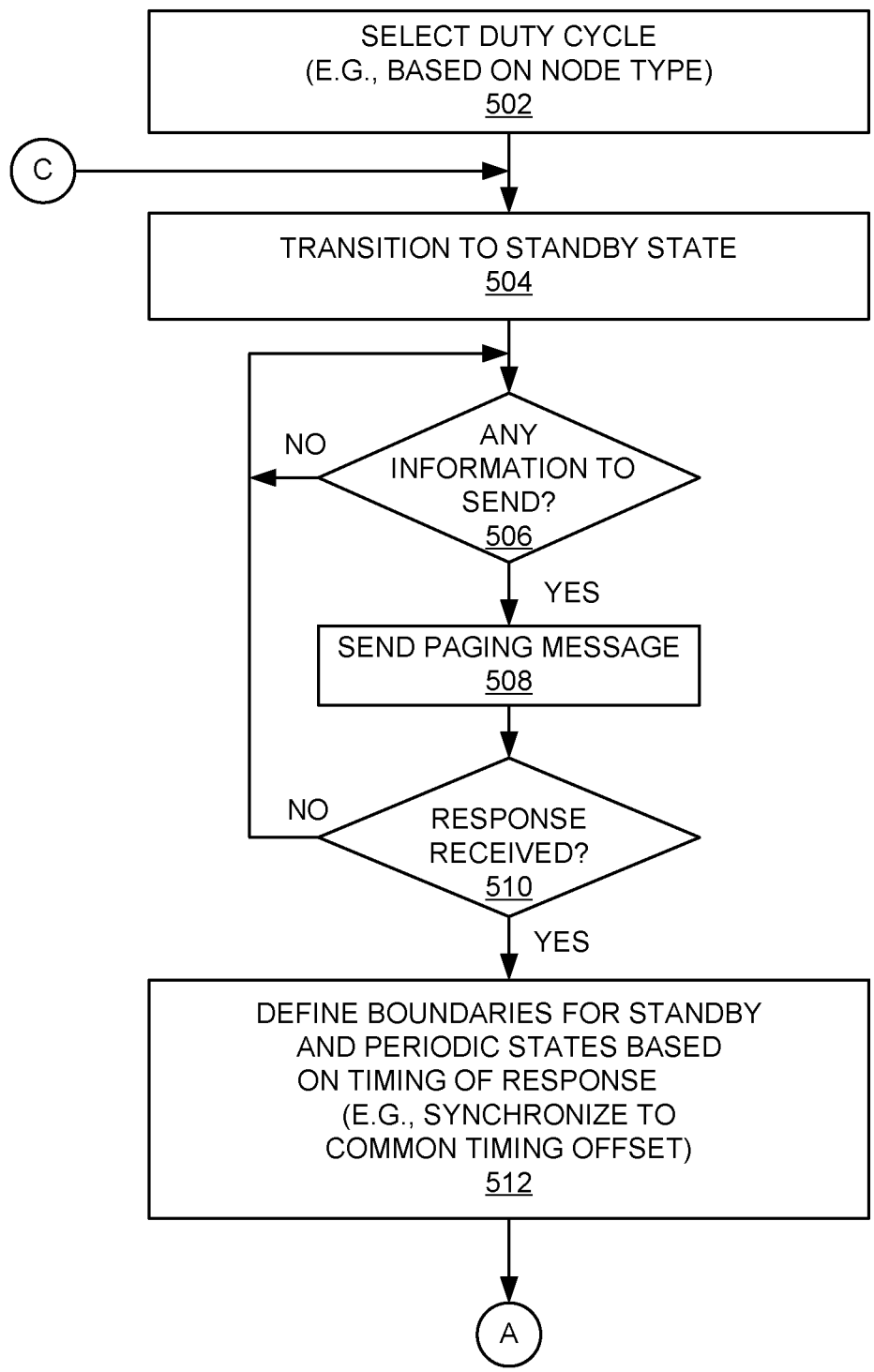
FIGS. 5A, 5B, and 5C are a flowchart of several sample aspects of duty cycle operations that may be performed by a transmitting node.
Figure 5B:
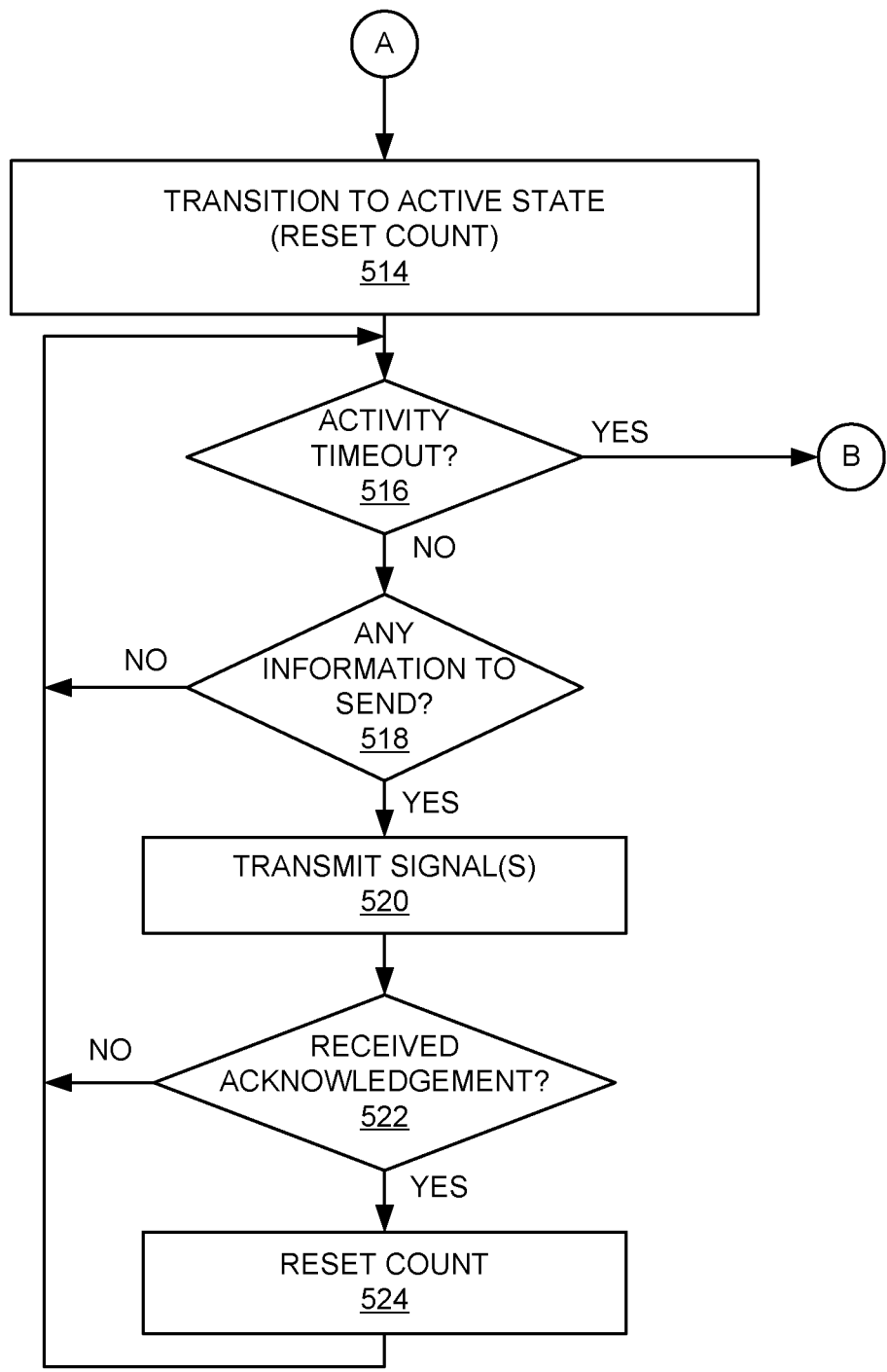
Figure 5C:
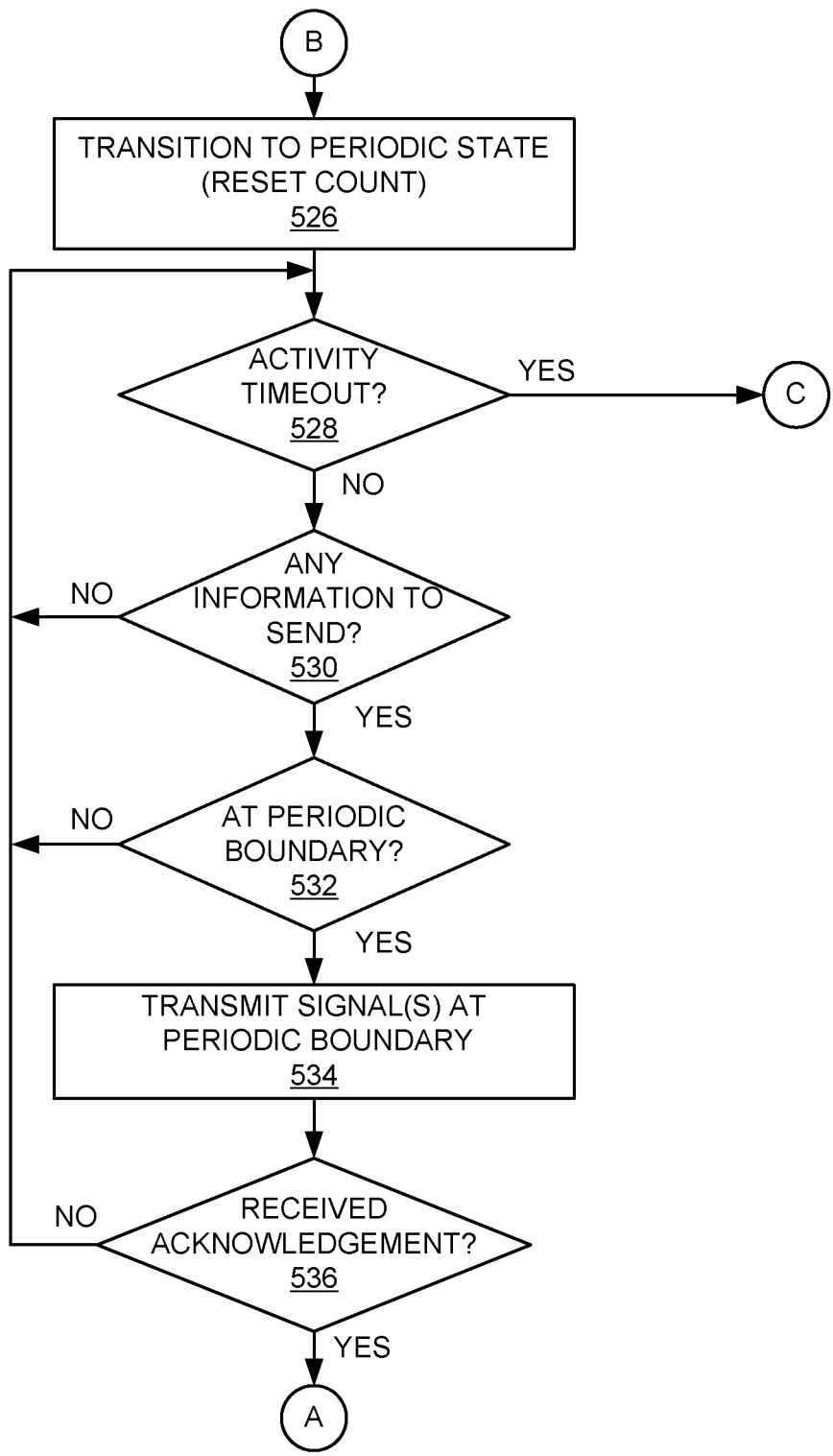

FIGS. 5A-5C describe various operations that a transmitting node may perform. Block 502 of FIG. 5A relates to operations that a transmitting node may perform to define state timing. Blocks 504-512 of FIG. 5A relate to operations that a transmitting node may perform in a standby state. Blocks 514-524 of FIG. 5B relate to operations that a transmitting node may perform in an active state. Blocks 526-536 of FIG. 5C relate to operations that a transmitting node may perform in a periodic state.

Figure 6:
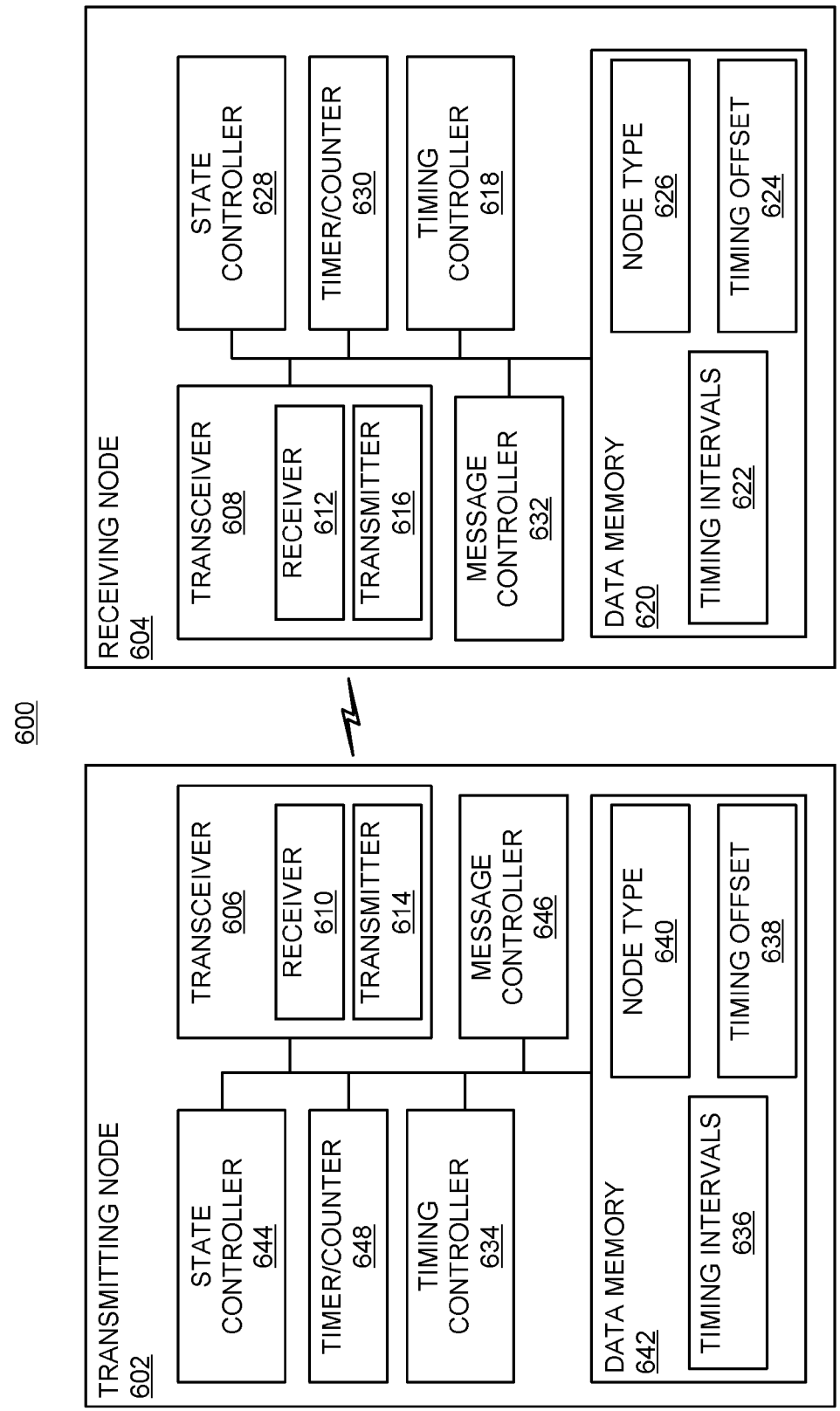
FIG. 6 is a simplified block diagram illustrating several sample aspects of components of a communication system.

FIG. 6 illustrates sample components of a transmitting node 602 (e.g., node 102 of FIG. 1) and an associated receiving node 604 (e.g., node 104). The nodes 602 and 604 include transceivers 606 and 608, respectively, for communicating with other nodes. The transceivers 606 and 608 respectively include receivers 610 and 612 and transmitters 614 and 616. Other components of the nodes 602 and 604 will be described in conjunction with the discussion of FIGS. 4A-5C that follows.

Referring to FIG. 4A, as represented by block 402 the receiving node 604 may select one or more duty cycle parameters based on node type. For example, the scan period and/or scan interval of one or more duty cycle levels (e.g., for one or more different states) may be selected based on the type of device embodying the receiving node 604 and/or the type of device embodying the transmitting node 602. In this way, the duty cycling of the nodes may be defined to accommodate desired operational characteristics of the nodes, desired quality of service of traffic flow supported by the nodes, application level requirements, some other criteria, or some combination of the above. In some cases, a timing controller 618 may manage the duty cycle parameters used by the node 604.

As an example, when a pair of nodes associate with one another they may negotiate a set of channel timing parameters to be used on a channel they establish. Such parameters may include, for example, the periodic and standby scan intervals and the TO1 and TO2 timeout periods discussed above. In this way, a given node may specify these parameters to meets its needs. For example, some types of nodes (e.g., a handset such as a cell phone) need to support quick connections with other nodes (e.g., peripheral devices) that may attempt to communicate with it at any time. In this case, the node may select relatively short scan intervals to reduce connection latency (e.g., latency associated with paging) even though this may result in an increase in power consumption. Conversely, for some types of nodes (e.g., a watch that provides a user display interface for an associated handset) it is more desirable to conserve power so that its battery lasts a long time. In this case, the node may select relatively long scan intervals and/or shorter timeout periods to reduce the power consumption associated with scanning even though this may result in increased latency and/or more dropped connections.

Also, in some cases the duty cycle parameters may be defined to more effectively support the type of traffic handled by a node. For example, some nodes may support periodic traffic such as voice over Internet Protocol ("VoIP"). In this case, the periodic scan interval and scan period may be defined to so that the node scans when the periodic traffic is being transmitted. Also, for some type of nodes, it may be important to maintain connections with other nodes even when the traffic flows carried by these connections have relatively long traffic lapses (e.g., bursty packet traffic). In this case, the node may select relatively long timeout periods to reduce the number of dropped connections even though this may result in an increase in power consumption.

As shown in FIG. 6, the node 604 may store its timing parameters and other information in some form of data memory 620. This information may include, for example, timing intervals 622 (e.g., scan intervals, scan periods, and pulse repetition period) and a timing offset 624 associated with each channel. In addition, the node 604 may maintain information 626 relating to its node type and/or the node types of one or more neighboring (e.g., associated) nodes.

As represented by block 404 of FIG. 4A, the receiving node 604 may correlate timing of the different states. In this way, a node (e.g., node 602) that has determined the timing of the node 604 in one state may readily determine (e.g., estimate) the timing of the node 604 in another state. For example, the timing controller 618 may synchronize the timing (e.g., the time of commencement) of the scan intervals of different states. In this case, after determining the timing of node 604's scan interval during the periodic state, the node 602 may readily determine the timing of node 604's scan interval during the standby state.

As represented by block 406, at some point in time (e.g., as discussed herein) the node 604 transitions to the standby state. For example, the node 604 may include a state controller 628 (e.g., comprising a state machine) that controls the current state of the node. Here, the state controller 628 may select a particular state (e.g., transition between states) based on one or more defined parameters (e.g., timeout parameters) and based on conditions associated with its instance of the state diagram 200.

During the standby state, most of the time the node 604 may operate in a low power mode where one or more components (e.g., of the transceiver 608) are powered off or are in a reduced power mode. As represented by blocks 408 and 410, in this state the node 604 waits until the next standby scan interval at which time it temporarily powers up the transceiver 608 and scans a channel for the designated scan period (e.g., scan period 304B in FIG. 3). To this end, the node 604 may employ a timer and/or a counter (timer/counter 630) that provides timing interval control signals for the node 604.

In some aspects, the state transitions of the node 604 may be performed independently of state transitions of other nodes in the system. For example, at block 406 the node 604 may make a decision regarding whether to change to the standby state based on a particular event it observes (e.g., the transmission or receipt of a signal) and based on information the node 604 maintains (e.g., node 604's own instance of the state diagram 200). Thus, the node 604 itself determines when it will transition states as opposed to transitioning its state in response to a message from another node that instructs the node 604 to switch to a particular state. Moreover, a transmitting node that is associated with the node 604 may not necessarily transition to the standby state when the node 604 transitions to that state.

As represented by block 412, if a signal was not received during the scan at block 410, the node 604 remains in the standby state. In this case, the node 604 may repeatedly perform the above operations until a signal is received. As mentioned above, a signal may take various forms. For example, in some aspects the node 604 may scan for a paging message (e.g., a simple message comprising a preamble and header) or for a data packet at block 410.

As represented by block 414, if a paging message is received at block 412, the node 604 sends a response to inform the paging node (e.g., node 602) that the paging message has been received. Here, a message controller 632 of the node 604 may cooperate with the transmitter 616 to send the paging response over the appropriate channel.

In some cases, the node 604 may receive paging messages from more than one node during the scan at block 410. In these cases, the node 604 may be configured to provide a single paging response that may be heard by all of the paging nodes. For example, if the node 102 of FIG. 1 receives a paging message from the node 104 and a paging message from the node 106 during a given scan period, the node 102 may be configured to send a single paging response at block 414 that may be heard by the nodes 104 and 106. In this way, all of the paging nodes may be made aware that the node 604 is transitioning to or is in the active state and, as discussed below, may acquire the timing of the node 604.

To this end, the duration of the paging response may be defined such that each of the paging nodes receives the single paging response. For example, the length of the preamble of the paging response may be defined based on the relative paging response scan time periods of the paging nodes. The paging response scan period is the period of time after transmission of a paging message that a paging node scans for a response to the paging message. Here, it should be appreciated that one paging node may send its paging message near the beginning of node 604's scan period while another node may send its paging message near the end of node 604's scan period. Hence, the length of the preamble may be defined to be at least as long as the receiving node's scan period (e.g., period 304B) and terminate some time after that scan period. In this way, any paging node that sends a paging message during node 604's scan period may receive at least a portion of the paging response preamble (e.g., comprising a repeated sequence) during the paging node's paging response scan period. In some aspects, the length of the paging response preamble may be defined to be longer than a regular packet. In some cases, the paging response may be transmitted on a specified channel (e.g., a broadcast channel common to all nodes) to enable multiple nodes to hear the paging response.

In some aspects the paging response may comprising timing information that a paging node may use, for example, to determine state timing of the node 604. For example, the node 604 may transmit the paging response at a time that is correlated to (e.g., immediately follows) the standby interval timing 306 (FIG. 3) and/or the periodic interval timing 302 of the node 604. The node 604 also may include information in the paging response that indicates the standby and/or periodic scan interval timing. For example, such information may comprise a timing offset value that indicates the amount of time between the transmission of the paging response and the standby and/or periodic scan interval boundary.

Referring now to block 416 of FIG. 4B, in response to the receipt of the signal at block 412, the node 604 transitions to the active state and commences continual active scanning of the channel. Such a state transition may be effected by operation of the state controller 628 upon, for example, receipt of the paging message at block 412 or after acknowledging the paging message at block 414. Again, the transition of the node 604 to the active state may be performed independently of any state transitions of other nodes in the system. For example, this state transition may be based simply on receipt of a signal at block 412 as opposed to being based on receipt of a state transition command.

As mentioned above, a timeout period (e.g., TO1) may be associated with the active state. In some aspects, this timeout period may be managed by the timer/counter 630. For example, at the commencement of the active state the timer/counter 630 may reset a count of a timer or the count (e.g., a scan count) of a counter that is used to indicate whether a timeout has occurred.

As represented by block 418, if there has not been any signaling activity (e.g., data transfer activity relating to the reception of packets or other forms of data) for a period of time greater than or equal to the timeout period, the node 604 may transition to the periodic state. Again, the transition of the node 604 to the periodic state may be performed independently of any state transitions of other nodes in the system. Thus, the node 604 may determine on its own to switch state and a transmitting node that is associated with the node 604 may not necessarily transition to the periodic state when the node 604 transitions to that state. The periodic state is described in more detail below in conjunction with FIG. 4C.

If there was not a timeout at block 418, the node 604 continues its active scanning. In FIG. 3, this continual active scanning is represented by the hatched area during the active state. In some aspects, the duty cycle of this continual scanning may be 100% (i.e., continuous scanning) or less than 100% (e.g., periodic scanning).

As an example of the latter case, the node 604 may repeatedly scan during the active state in a manner that ensures that the node 604 will receive any packets that are transmitted during this time. For example, the node 604 may scan at intervals that are less than the duration of the preamble sequence of each signal (e.g., data packet) sent by an associated transmitting node. In other words, the active scan interval may correspond to a scanning rate that is high enough to capture a preamble of an asynchronous packet (e.g., a packet that is sent at any time during the active state). In this way, when a packet is sent during the active state, the node 604 may receive the preamble sequence, and commence scanning (e.g., at 100% duty cycle) for the remainder of the packet.

As represented by block 420 of FIG. 4B, the scanning during the active state may thus be based on an active scan interval whereby the node 604 waits until the next active scan interval (not shown in FIG. 3) to scan the channel for a designated scan period (block 422). In a similar manner as above, the timer/counter 630 may provide timing interval signals for the active state.

In the event the continual active scanning does not employ an active scan interval, the scanning of block 422 may instead relate to 100% duty cycle scanning. In this case, the receiver 612 may be activated for the entire active scanning period.

As represented by block 424, if a signal (e.g., packet) was not received as a result of the scanning at block 422, the node 604 will continue active scanning until a timeout condition is reached or until a signal is received. As mentioned above, the timeout period may be based on a defined period of time or a defined number of scans. As an example of the latter case, when the node 604 employs periodic scanning during the active state, a timeout may be indicated when no signal has been received for a defined number of scans (e.g., 4 or 5).

If a signal is received at block 424, the node 604 resets the timeout count (e.g., resets a timer or counter to 0) at block 426. In this way, the timeout period will be extended (e.g., TO1 of FIG. 3 shifts to the right).

As represented by block 428, the node 604 may receive a paging message from another node while the node 604 is in the active state. For example, a transmitting node that has not communicated with the node 604 for some time may not know the current state of the node 604. Consequently, that transmitting node may be in the standby state and may therefore send paging messages when it wishes to establish communication with the node 604.

As represented by block 430, the node 604 transmits a paging response if a paging message is received at block 428. Since a paging message may be received at any time during the active state, the paging response may not be sent at a time that corresponds to the standby and/or periodic scan interval boundary (e.g., as in the standby state). Accordingly, the node 604 may label this paging response in a different manner than the paging response transmitted at block 414 so that the paging node does not assume that the timing of this paging response is correlated to the standby scan interval timing.

In some cases the paging response transmitted at block 430 may comprise timing information that a paging node may use to determine state timing of the node 604. For example, the node 604 may transmit the paging response at a time that is correlated (e.g., synchronized) to the interval timing of the node. Referring to FIG. 3, the node 604 may transmit the paging response at a time that coincides with the timing of the periodic scan interval (e.g., as represented by the period 312) and/or that coincides with the timing of the standby scan interval. In some cases, the node 604 may include information in the paging response that is indicative of the interval timing. For example, this information may indicate the timing offset between the time of transmission of the paging response and a scan interval boundary (e.g., the time from the standby scan interval boundary and/or the periodic scan interval boundary).

Also, the node may send a single paging response at block 430 if multiple paging messages are received within a given period of time at block 428. This may involve, for example, operations that are similar to those discussed above in conjunction with block 414.

As represented by block 432, if a paging message is not received at block 428 (e.g., the signal was a data packet), the node 604 may transmit a message to acknowledge receipt of the signal. For example, the message controller 632 may cooperate with the transmitter 616 to transmit an acknowledgement packet.

After transmitting the paging response or acknowledgement, the operational flow may return back to block 418 whereby the node 604 continues to actively scan the channel. The node 604 may thus repeatedly perform the above operations until an active state timeout occurs.

Referring now to block 434 of FIG. 4C, after transitioning to the periodic state upon expiration of the active state timeout timer or reaching the defined timeout scan count, the node 604 commences periodic scanning of the channel. Such a transition may involve, for example, the state controller 628 loading timing interval parameters associated with the periodic state into the timer/counter 630. Again, the node 604 may independently determine whether to transition to the periodic state (e.g., simply based on a failure to receive a signal).

As mentioned above, a timeout period (e.g., TO2) may be associated with the periodic state. Thus, at the commencement of the periodic state the timer/counter 630 may reset a count of a timer or a count (e.g., a scan count) of a counter that is used to indicate whether a timeout has occurred.

As represented by block 436, the node 604 may transition to the standby state if the timeout condition is met. Thus, in implementations that use a timer-based timeout, the periodic state may timeout if there has not been any signaling activity (e.g., data transfer) for a period of time greater than or equal to the periodic timeout period. Alternatively, in implementations that use a scan count-based timeout, the periodic state may timeout if, for example, a defined number of periodic scans (e.g., 4 or 5) have been performed since the last signaling activity.

If there was not a timeout at block 436, the node 604 continues periodically scanning the channel. As represented by block 438, the scanning during the periodic state may be based on a periodic scan interval whereby the node 604 waits until the next periodic scan interval (e.g., interval 302 in FIG. 3) to scan the channel.

If the scan interval boundary is reached before a timeout occurs, at block 440 the node 604 may temporarily activate the transceiver 608 to scan the channel for a designated scan period (e.g., period 304A). If applicable, the node 604 may increment the scan count at this time.

As represented by block 442, if a signal (e.g., a packet) was not received as a result of the scanning at block 440, the operational flow may return to block 436. Thus, the node 604 may continue periodic scanning until a timeout condition is reached or until a signal is received.

If a signal is received at block 442, as represented by block 444, the node 604 may transmit a message to acknowledge receipt of the signal (e.g., acknowledge a data packet). The node may then disable the standby state timeout timer/counter and transition to the active state to actively scan for additional packets.

In the event the received signal is a paging message (e.g., from a transmitting node that does not know the state of the node 604), the node 604 may transmit a paging response at block 444. In some aspects this operation may be similar to the operations described above at block 430. For example, the response may indicate the interval timing of the node 604 and a single response may be sent in the case where multiple paging messages are received during the periodic scan period.

Referring now to the transmitting node operations of FIG. 5A, as represented by block 502 the transmitting node 602 (e.g., a timing controller 634 of the node 602) may select one or more duty cycle parameters for channel communication based on node type. These operations may be similar and/or complementary to the parameter selection operations described above in conjunction with block 402.

As shown in FIG. 6, the node 602 also may store channel information such as timing intervals 636, timing offset 638, and node type 640 in a data memory 642. Again, this information may be similar and/or complementary to the information stored in the data memory 620 as discussed above.

As represented by block 504, at some point in time (e.g., after power up or at some other time as discussed herein) the node 602 transitions to the standby state. Similar to the node 604, the node 602 may include a state controller 644 (e.g., comprising a state machine) that controls the current state of the node 602. Here, the operation of the state controller 644 (e.g., transitioning between states) may be based, for example, on conditions associated with an instance of the state diagram 200 defined for the node 602.

In some aspects, the state transitions of the node 602 also are performed independently of state transitions of other nodes in the system. Again, the node 602 itself may determine when it will transition states as opposed to transitioning its state in response to a command from another node that instructs the node 602 to switch to a particular state. For example, at block 504 the node 602 may make a decision regarding whether to transition to the standby state based on certain events detected by the node 602 (e.g., lack of signal transmissions) and based on information maintained by the node 602 (e.g., node 602's own instance of the state diagram 200). In some aspects, a decision by the node 602 to change states may be based on an estimate of the current state of an associated receiving node. For example, based on information it acquires (e.g., relating to a lack of signal transmissions or the lack of any received responses to a transmission), the node 602 may attempt to mimic some or all of the state transitions of an associated receiving node (e.g., node 604). Thus, the node 602 may transition to the standby state or some other state whenever it determines (e.g., estimates) that the node 604 has transitioned to that state. Here, although a receiving node that is associated with the node 602 may be in a given state at the same time as the node 604, this may not always be the case.

As represented by block 506, the node 602 may remain in the standby state until it has information (e.g., data) to send to its associated receiving node. During the standby state, most of the time the node 602 may be in a low power mode where one or more components (e.g., of the transceiver 606) are powered off or are in a reduced power mode.

As represented by blocks 508 and 510, when the node 602 has information to send, it may repeatedly send a paging message until it receives a response to the paging message from the receiving node. In the example of FIG. 6, a message controller 646 may cooperate with the transceiver 606 to send messages to other nodes and process received messages.

As represented by block 512, the node 602 (e.g., the timing controller 634) may define its duty cycle timing boundaries based on receipt of the paging response. For example, as discussed above a receiving node may send a paging response at a time that is correlated to a scan interval boundary (e.g., of the standby state or the periodic state). Thus, the node 602 may use the time of receipt of the paging response to determine the duty cycle interval timing of the receiving node. Also as discussed above, a paging response may include timing offset information that relates the transmission time of the paging response with periodic and/or standby state scan timing. In some cases, the value of the timing offset may be common to (e.g., the same for) both the periodic scan boundary and the standby scan boundary.

Thus, by synchronizing to the time of receipt of the paging message or some other suitable signal (and optionally synchronizing based on a received timing offset indication), the node 602 may determine when to send signals (e.g., packets) in the periodic state, may determine when to send signals (e.g., paging messages) in the standby state, or may determine when to perform some other timing-based operation. To this end, the node 602 may employ a timer and/or a counter (timer/counter 648) that provides timing interval signals for the node 602.

Upon receipt of the paging response, the node 602 transitions to the active state as represented by block 514 of FIG. 5B. Again, in some aspects this state transition may be independent of the state transitions of other nodes in the system. For example, the node 602 may independently determine whether to transition to the active state (e.g., based on a determination that its associated receiving node is in the active state as indicated by node 602's receipt of a paging response from the receiving node).

As mentioned above, a timeout period (e.g., TO1) may be associated with the active state. Thus, at the commencement of the active state for node 602, the timer/counter 648 may reset a count of a timer that is used to indicate whether a timeout has occurred. Also as mentioned above, this timeout period may be based on a defined time period or a period of time associated with a defined quantity of active state scans.

As represented by block 516, if there has not been any signaling activity (e.g., data transfer activity relating to the transmission of packets or other forms of data) for a period of time greater than or equal to the timeout period, the node 602 may transition to the periodic state. Again, the node 602 may independently determine whether to transition to the periodic state (e.g., based on a lack of signaling that leads to a determination that its associated receiving node is in the periodic state). The periodic state for the node 602 is described in more detail below in conjunction with FIG. 5C.

If there was not a timeout at block 516, the node 602 determines whether it has any information (e.g., a data packet, etc.) to send to its associated receiving node at block 518. If not, the operations of blocks 516 and 518 may be repeated until there is information to send or until a timeout occurs. If there was information to send at block 518, the node 602 may temporarily activate the transceiver 606 to transmit a signal at block 520.

As represented by block 522, the node 602 may wait for a message from the receiving node acknowledging receipt of the signal. Here, the message controller 646 may cooperate with the receiver 610 to process any received acknowledgment messages.

If an acknowledgement is not received before an activity timeout occurs (as represented for convenience by the operational flow to block 516), the node 602 may transition to the periodic state as discussed above. Thus, this example illustrates that the node 602 may remain in the current state if it receives a particular signal (e.g., message) within the timeout period or may change state if it does not receive that signal within the timeout period. Also, in some cases the node 602 may perform some form of error recovery operation (e.g., packet retransmission) if an acknowledgement is not received within a defined amount of time. The node 602 may perform one or more transmissions (e.g., as represented by block 520) within a given timeout period. Depending on the particular implementation, the node 602 may wait for an acknowledgement before sending additional signals (e.g., messages) or may continue to send signals while waiting for one or more acknowledgements.

If an acknowledgement is received at block 522, the node 602 resets the timeout count at block 524. The operational flow then returns to block 516 whereby the node 602 may continue sending information (e.g., data) in the active state.

Referring now to block 526 of FIG. 5C, the node 602 transitions to the periodic state upon expiration of its active state timeout timer as mentioned above. Such a transition may involve, for example, the state controller 644 loading timing interval parameters associated with the periodic state into the timer/counter 648. Again, the node 602 may independently determine whether to transition to the periodic state (e.g., based on a lack of signaling activity which may lead to a determination that its associated receiving node is in the periodic state).

As mentioned above, a timeout period (e.g., TO2) associated with a defined time period or a defined number of scans may be associated with the periodic state. Thus, at the commencement of the periodic state the timer/counter 648 may reset a count of a timer that is used to indicate whether a timeout has occurred.

As represented by block 528, the periodic state may timeout if there has not been any signaling activity (e.g., data transfer) for a period of time greater than or equal to the periodic timeout period. The node 602 may thus transition to the standby state in this case. Again, the node 602 may make its own independent determination of whether to transition to the standby state.

If there was not a timeout at block 528, the node 602 continues its periodic state operations. Thus, as represented by block 530 the node 602 determines whether it has any information (e.g., a data packet) to send. If so, the node 602 waits until the next periodic state boundary corresponding to the periodic scan times of the associated receiving node (block 532) at which time its may temporarily activate the transceiver 606 to transmit a corresponding signal at that time (block 534)—provided there has not been an intervening timeout at block 528.

In the event the node 602 transmitted a signal at block 534, the node 602 waits for an acknowledgement at block 536 (e.g., while monitoring for an activity timeout and optionally continuing to transmit signals in a similar manner as discussed above in conjunction with block 522). Also as discussed above, if an acknowledgement is not received within a defined period of time, the node 602 may optionally perform error recovery operations. If an acknowledgement is received at block 536 before a timeout occurs, the node 602 transitions to the active state to commence active (e.g., asynchronous) transmissions to the receiving node.

From the above, it should be appreciated that this duty cycling scheme enables data transfer when the transmitting node and the receiving node are in a lower duty cycle state (e.g., at blocks 412, 442, and 534). In addition, this scheme provides a mechanism to move from a lower duty cycle state to a higher duty cycle state to facilitate more efficient handling of subsequent data transfers.

The teachings herein may be implemented in a variety of ways. For example, a node may transition between states based on various criteria. Also, different criteria may be used to determine the duty cycle timing parameters.

In some aspects, a given implementation may utilize two, three or more levels of duty cycle. Designating the number of duty cycles as "m" duty cycles, the duty cycling in a system may be defined, for example, as: level 1=$x_1$% duty cycling, level 2=$x_2$% duty cycling, . . . , level m=$x_m$% duty cycling (where $x_m$< . . . <$x_2$<$x_1$). After the last packet transmission/reception, a receiving node first performs channel scans with duty cycle $x_1$ for a first timeout period (e.g., TO1), the receiving node then performs channel scans with duty cycle $x_2$ for a second timeout period (e.g., TO2), and so on.

In some aspects, a given state may have multiple duty cycle levels (e.g., for performing channel scans). For example, the duty cycling of the active and standby states described above may be considered as two different levels of active state duty cycling. Here, a node may operate in a standby state where it is not actively engaged in packet transfer or it may operate in an active state where it is actively engaged in packet transfer. In the active state a receiving node may continually scan the channel for the timeout period TO1 following the transmission/reception of the last data packet. The receiving node may then scan the channel periodically based on the interval 302 for the timeout period TO2 before going back to standby state. Thus, in this case the active state may be defined to support a high level of duty cycling for relatively continual data transfers and a lower level of duty cycling to save power when handling data flows that are less continual. Hence, the overall duty cycle of the active state may be less than 100%, but greater than the duty cycle of the standby state.

Figure 7:
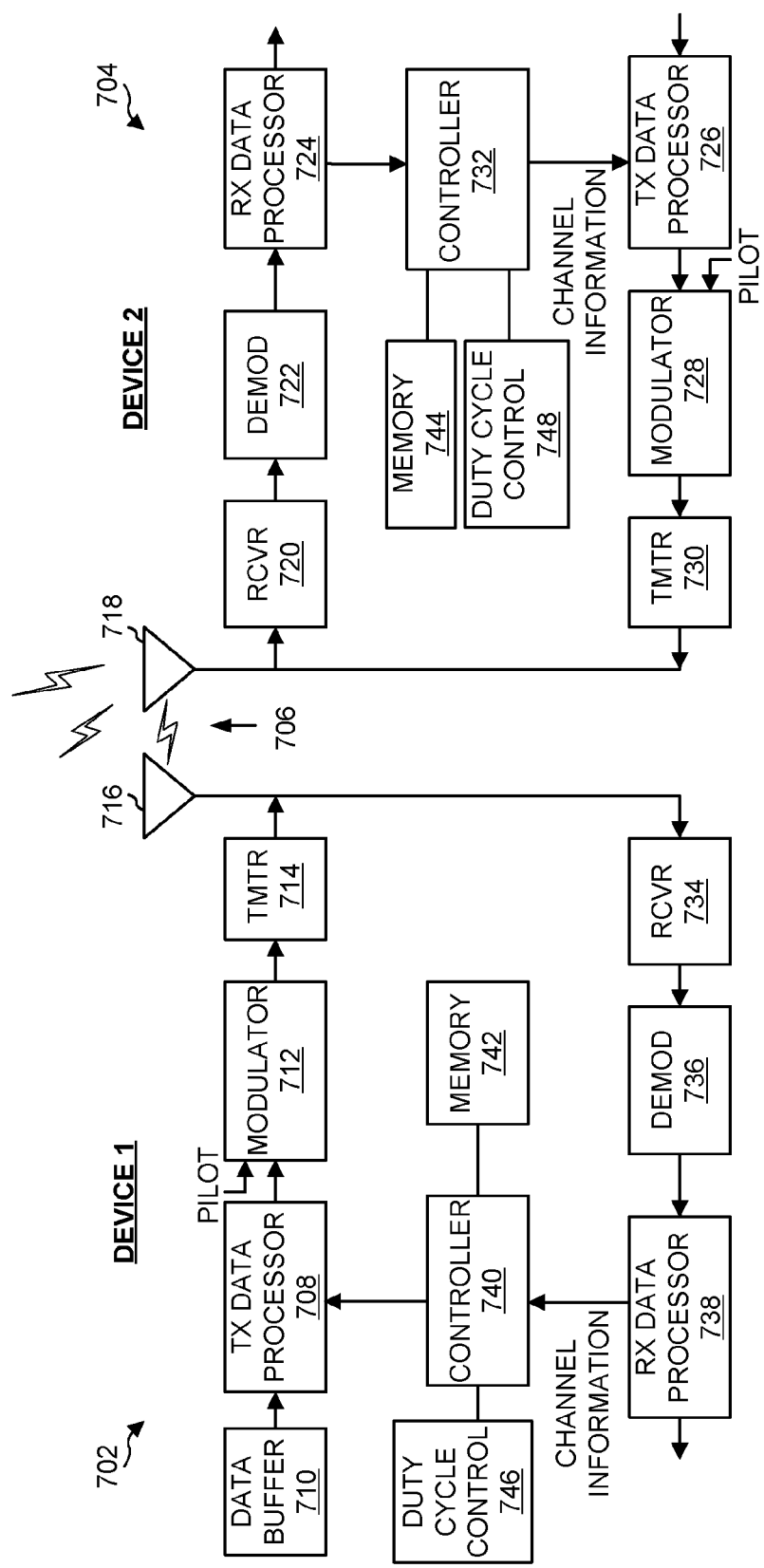
FIG. 7 is a simplified block diagram of several sample aspects of communication components.

The teachings herein may be incorporated into a device employing various components for communicating with at least one other device. FIG. 7 depicts several sample components that may be employed to facilitate communication between devices. Here, a first device 702 and a second device 704 are adapted to communicate via a wireless communication link 706 over a suitable medium.

Initially, components involved in sending information from the device 702 to the device 704 (e.g., a reverse link) will be treated. A transmit ("TX") data processor 708 receives traffic data (e.g., data packets) from a data buffer 710 or some other suitable component. The transmit data processor 708 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 712 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 714 processes (e.g., converts to analog, filters, amplifies, and frequency upconverts) the output chip stream and generates a modulated signal, which is then transmitted from an antenna 716.

The modulated signals transmitted by the device 702 (along with signals from other devices in communication with the device 704) are received by an antenna 718 of the device 704. A receiver ("RCVR") 720 processes (e.g., conditions and digitizes) the received signal from the antenna 718 and provides received samples. A demodulator ("DEMOD") 722 processes (e.g., demodulates and detects) the received samples and provides detected data symbols, which may be a noisy estimate of the data symbols transmitted to the device 704 by the other device(s). A receive ("RX") data processor 724 processes (e.g., symbol demaps, deinterleaves, and decodes) the detected data symbols and provides decoded data associated with each transmitting device (e.g., device 702).

Components involved in sending information from the device 704 to the device 702 (e.g., a forward link) will be now be treated. At the device 704, traffic data is processed by a transmit ("TX") data processor 726 to generate data symbols. A modulator 728 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 730 and transmitted from the antenna 718. In some implementations signaling for the forward link may include power control commands and other information (e.g., relating to a communication channel) generated by a controller 732 for all devices (e.g. terminals) transmitting on the reverse link to the device 704.

At the device 702, the modulated signal transmitted by the device 704 is received by the antenna 716, conditioned and digitized by a receiver ("RCVR") 734, and processed by a demodulator ("DEMOD") 736 to obtain detected data symbols. A receive ("RX") data processor 738 processes the detected data symbols and provides decoded data for the device 702 and the forward link signaling. A controller 740 receives power control commands and other information to control data transmission and to control transmit power on the reverse link to the device 704.

The controllers 740 and 732 direct various operations of the device 702 and the device 704, respectively. For example, a controller may determine an appropriate filter, reporting information about the filter, and decode information using a filter. Data memories 742 and 744 may store program codes and data used by the controllers 740 and 732, respectively.

FIG. 7 also illustrates that the communication components may include one or more components that perform duty cycle operations as taught herein. For example, a duty cycle control component 746 may cooperate with the controller 740 and/or other components of the device 702 to send/receive information to/from another device (e.g., device 704). Similarly, a duty cycle control component 748 may cooperate with the controller 732 and/or other components of the device 704 to send/receive information to/from another device (e.g., device 702). It should be appreciated that for each device 702 and 704 the functionality of two or more of the described components may be provided by a single component. For example, a single processing component may provide the functionality of the duty cycle control component 746 and the controller 740 and a single processing component may provide the functionality of the duty cycle control component 748 and the controller 732.

A wireless device may include various components that perform functions based on signals (e.g., data) that are transmitted by a transmitter or received by a receiver at the wireless device. For example, a wireless headset may include a transducer adapted to provide an audio output based on data received by the receiver or data received during one or more of the states described herein. A wireless watch may include a user interface adapted to provide an indication based on data received by the receiver or data received during one or more of the states described herein. A wireless sensing device may include a sensor adapted to provide data to be transmitted by the transmitter or transmitted during one or more of the states described herein.

A wireless device may communicate via one or more wireless communication links that are based on or otherwise support any suitable wireless communication technology. For example, in some aspects a wireless device may associate with a network. In some aspects the network may comprise a personal area network (e.g., supporting a wireless coverage area on the order of 30 meters) or a body area network (e.g., supporting a wireless coverage area on the order of 10 meters) implemented using ultra-wideband ("UWB") technology or some other suitable technology. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitters 614 and 616 and receivers 610 and 612) that may include various components (e.g., signal generators and signal processors) that facilitate communication over a wireless medium.

In some aspects a wireless device may communicate via a pulse-based (e.g., impulse based) wireless communication link. For example, an impulse-based wireless communication link may utilize ultra-wideband pulses that have a relatively short length (e.g., on the order of a few nanoseconds or less) and a relatively wide bandwidth. In some aspects the ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., an access point for a body area network or a personal area network) for a communication system. Such an access device may provide, for example, connectivity to another network (e.g., a wide area network such as the Internet or a cellular network) via a wired or wireless communication link. Accordingly, the access device may enable another device (e.g., an access terminal for a body area network or a personal area network) to access the other network or some other functionality. In addition, it should be appreciated that one or both of the devices may be portable or, in some cases, relatively non-portable.

The components described herein may be implemented in a variety of ways. Referring to FIGS. 8 and 9, apparatuses 800 and 900 are represented as a series of interrelated functional blocks that may represent functions implemented by, for example, one or more integrated circuits (e.g., an ASIC) or may be implemented in some other manner as taught herein.

As discussed herein, an integrated circuit may include a processor, software, other components, or some combination thereof.

The apparatuses 800 and 900 may include one or more modules that may perform one or more of the functions described above with regard to various figures. For example, an ASIC for scanning or receiving 802 may correspond to, for example, a receiver 612 as discussed herein. An ASIC for transitioning state 804 may correspond to, for example, a state controller 628 as discussed herein. An ASIC for correlating timing 806 may correspond to, for example, a timing controller 618 as discussed herein. An ASIC for transmitting 808 may correspond to, for example, a transmitter 616 as discussed herein. An ASIC for transmitting 902 may correspond to, for example, a transmitter 614 as discussed herein. An ASIC for receiving or scanning 904 may correspond to, for example, a receiver 610 as discussed herein. An ASIC for defining transmission times or synchronizing timing 906 may correspond to, for example, a timing controller 634 as discussed herein. An ASIC for transitioning state 908 may correspond to, for example, a state controller 644 as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses 800 and 900 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 8 and 9 as well as other components and functions described herein, may be implemented using any suitable means. Such means also may be implemented, at least in part, using corresponding structure as taught herein. For example, the components described above in conjunction with the "ASIC for" components of FIGS. 8 and 9 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

The invention claimed is:

1. A method of wireless communication, comprising: scanning a channel according to a first duty cycle during a first operational state; scanning the channel according to a second duty cycle during a second operational state, wherein the second duty cycle is lower than the first duty cycle; and scanning the channel according to a third duty cycle during a third operational state, wherein the third duty cycle is lower than the second duty cycle; and wherein the channel scanning according to the second duty cycle comprises periodically scanning at times based on a first time interval, the channel scanning according to the third duty cycle comprises periodically scanning at times based on a second time interval, and the second time interval is longer than the first time interval.

2. The method of claim 1, wherein the first operational state comprises an active state, the second operational state comprises a periodic state, and the third operational state comprises a standby state.

3. The method of claim 1, wherein the channel scanning according to the first duty cycle comprises continuously scanning the channel.

4. The method of claim 1, wherein: the channel scanning according to the first duty cycle comprises periodically scanning at times based on a third time interval; and the third time interval is shorter than the first time interval.

5. The method of claim 4, wherein the third time interval corresponds to a scanning rate that is high enough to capture a preamble of an asynchronous packet.

6. The method of claim 4, wherein a duration of any one of the first time interval, the second time interval, or the third time interval is based on at least one of: a size of a packet preamble, clock drift, or a probability of not detecting a packet.

7. The method of claim 1, further comprising: transitioning from the first operational state to the second operational state if a signal is not received during a first timeout period; and transitioning from the second operational state to the third operational state if a signal is not received during a second timeout period.

8. The method of claim 7, wherein each signal comprises a packet, a data packet, a paging message, a discovery message, or a control message.

9. The method of claim 1, further comprising: transitioning from the first operational state to the second operational state if a signal is not received during a first defined quantity of successive channel scans; and transitioning from the second operational state to the third operational state if a signal is not received during a second defined quantity of successive channel scans.

10. The method of claim 9, wherein each signal comprises a packet, a data packet, a paging message, a discovery message, or a control message.

11. The method of claim 1, further comprising: transitioning from the third operational state to the first operational state if a signal is received; and transitioning from the second operational state to the first operational state if a signal is received.

12. The method of claim 11, wherein each signal comprises a packet, a data packet, a paging message, a discovery message, or a control message.

13. The method of claim 1, further comprising correlating periodic timing of the scanning during the third operational state with periodic timing of the scanning during the second operational state.

14. The method of claim 13, wherein the periodic timing of the scanning during the third operational state and the periodic timing of the scanning during the second operational state are based on a common timing offset.

15. The method of claim 1, further comprising transmitting a response signal if a signal is received during any of the channel scanning, wherein the response signal comprises an acknowledgement message or a response to a paging message.

16. The method of claim 1, further comprising: receiving a paging message; and transmitting a response to the paging message, wherein timing of the transmission of the response provides an indication of timing of the scanning during the second operational state, the third operational state, or the second and third operational states.

17. The method of claim 1, further comprising: receiving a paging message; and transmitting a response to the paging message, wherein the response includes an indication of timing of the scanning during the second operational state, the third operational state, or the second and third operational states.

18. The method of claim 1, further comprising: receiving paging messages from a plurality of nodes within a defined period of time; and transmitting a single response to the paging messages.

19. The method of claim 18, wherein the transmission of the single response comprises broadcasting the single response over a channel that is common to the plurality of nodes.

20. The method of claim 18, wherein a length of a preamble of the single response is based on relative scanning period times associated with the plurality of nodes.

21. The method of claim 1, wherein at least one of the first duty cycle, the second duty cycle, or the third duty cycle is based on a node type.

22. An apparatus for wireless communication, comprising: a state controller configured to control transitions between a first operational state, a second operational state, and a third operational state; and a receiver configured to: scan a channel according to a first duty cycle during the first operational state; scan the channel according to a second duty cycle during the second operational state, wherein the second duty cycle is lower than the first duty cycle; and scan the channel according to a third duty cycle during the third operational state, wherein the third duty cycle is lower than the second duty cycle; and wherein the channel scanning according to the second duty cycle comprises periodically scanning at times based on a first time interval, the channel scanning according to the third duty cycle comprises periodically scanning at times based on a second time interval, and the second time interval is longer than the first time interval.

23. The apparatus of claim 22, wherein the first operational state comprises an active state, the second operational state comprises a periodic state, and the third operational state comprises a standby state.

24. The apparatus of claim 22, wherein the channel scanning according to the first duty cycle comprises continuously scanning the channel.

25. The apparatus of claim 22, wherein: the channel scanning according to the first duty cycle comprises periodically scanning at times based on a third time interval; and the third time interval is shorter than the first time interval.

26. The apparatus of claim 25, wherein the third time interval corresponds to a scanning rate that is high enough to capture a preamble of an asynchronous packet.

27. The apparatus of claim 25, wherein a duration of any one of the first time interval, the second time interval, or the third time interval is based on at least one of: a size of a packet preamble, clock drift, or a probability of not detecting a packet.

28. The apparatus of claim 22, wherein the state controller is further configured to: transition from the first operational state to the second operational state if a signal is not received during a first timeout period; and transition from the second operational state to the third operational state if a signal is not received during a second timeout period.

29. The apparatus of claim 28, wherein each signal comprises a packet, a data packet, a paging message, a discovery message, or a control message.

30. The apparatus of claim 22, wherein the state controller is further configured to: transition from the first operational state to the second operational state if a signal is not received during a first defined quantity of successive channel scans; and transition from the second operational state to the third operational state if a signal is not received during a second defined quantity of successive channel scans.

31. The apparatus of claim 30, wherein each signal comprises a packet, a data packet, a paging message, a discovery message, or a control message.

32. The apparatus of claim 22, wherein the state controller is further configured to: transition from the third operational state to the first operational state if a signal is received; and transition from the second operational state to the first operational state if a signal is received.

33. The apparatus of claim 32, wherein each signal comprises a packet, a data packet, a paging message, a discovery message, or a control message.

34. The apparatus of claim 22, further comprising a timing controller configured to correlate periodic timing of the scanning during the third operational state with periodic timing of the scanning during the second operational state.

35. The apparatus of claim 34, wherein the periodic timing of the scanning during the third operational state and the periodic timing of the scanning during the second operational state are based on a common timing offset.

36. The apparatus of claim 22, further comprising a transmitter configured to transmit a response signal if a signal is received by the receiver during any of the channel scanning, wherein the response signal comprises an acknowledgement message or a response to a paging message.

37. The apparatus of claim 22, wherein: the receiver is further configured to receive a paging message; and the apparatus further comprises a transmitter configured to transmit a response to the paging message, wherein timing of the transmission of the response provides an indication of timing of the scanning during the second operational state, the third operational state, or the second and third operational states.

38. The apparatus of claim 22, wherein: the receiver is further configured to receive a paging message; and the apparatus further comprises a transmitter configured to transmit a response to the paging message, wherein the response includes an indication of timing of the scanning during the second operational state, the third operational state, or the second and third operational states.

39. The apparatus of claim 22, wherein: the receiver is further configured to receive paging messages from a plurality of nodes within a defined period of time; and the apparatus further comprises a transmitter configured to transmit a single response to the paging messages.

40. The apparatus of claim 39, wherein the transmission of the single response comprises broadcasting the single response over a channel that is common to the plurality of nodes.

41. The apparatus of claim 39, wherein a length of a preamble of the single response is based on relative scanning period times associated with the plurality of nodes.

42. The apparatus of claim 22, wherein at least one of the first duty cycle, the second duty cycle, or the third duty cycle is based on a node type.

43. An apparatus for wireless communication, comprising: means for scanning a channel according to a first duty cycle during a first operational state; means for scanning the channel according to a second duty cycle during a second operational state, wherein the second duty cycle is lower than the first duty cycle; and means for scanning the channel according to a third duty cycle during a third operational state, wherein the third duty cycle is lower than the second duty cycle; and wherein the channel scanning according to the second duty cycle comprises periodically scanning at times based on a first time interval, the channel scanning according to the third duty cycle comprises periodically scanning at times based on a second time interval, and the second time interval is longer than the first time interval.

44. The apparatus of claim 43, wherein the first operational state comprises an active state, the second operational state comprises a periodic state, and the third operational state comprises a standby state.

45. The apparatus of claim 43, wherein the channel scanning according to the first duty cycle comprises continuously scanning the channel.

46. The apparatus of claim 43, wherein: the channel scanning according to the first duty cycle comprises periodically scanning at times based on a third time interval; and the third time interval is shorter than the first time interval.

47. The apparatus of claim 46, wherein the third time interval corresponds to a scanning rate that is high enough to capture a preamble of an asynchronous packet.

48. The apparatus of claim 46, wherein a duration of any one of the first time interval, the second time interval, or the third time interval is based on at least one of: a size of a packet preamble, clock drift, or a probability of not detecting a packet.

49. The apparatus of claim 43, further comprising: means for transitioning from the first operational state to the second operational state if a signal is not received during a first timeout period; and means for transitioning from the second operational state to the third operational state if a signal is not received during a second timeout period.

50. The apparatus of claim 49, wherein each signal comprises a packet, a data packet, a paging message, a discovery message, or a control message.

51. The apparatus of claim 43, further comprising: means for transitioning from the first operational state to the second operational state if a signal is not received during a first defined quantity of successive channel scans; and means for transitioning from the second operational state to the third operational state if a signal is not received during a second defined quantity of successive channel scans.

52. The apparatus of claim 51, wherein each signal comprises a packet, a data packet, a paging message, a discovery message, or a control message.

53. The apparatus of claim 43, further comprising: means for transitioning from the third operational state to the first operational state if a signal is received; and means for transitioning from the second operational state to the first operational state if a signal is received.

54. The apparatus of claim 53, wherein each signal comprises a packet, a data packet, a paging message, a discovery message, or a control message.

55. The apparatus of claim 43, further comprising means for correlating periodic timing of the scanning during the third operational state with periodic timing of the scanning during the second operational state.

56. The apparatus of claim 55, wherein the periodic timing of the scanning during the third operational state and the periodic timing of the scanning during the second operational state are based on a common timing offset.

57. The apparatus of claim 43, further comprising means for transmitting a response signal if a signal is received during any of the channel scanning, wherein the response signal comprises an acknowledgement message or a response to a paging message.

58. The apparatus of claim 43, further comprising: means for receiving a paging message; and means for transmitting a response to the paging message, wherein timing of the transmission of the response provides an indication of timing of the scanning during the second operational state, the third operational state, or the second and third operational states.

59. The apparatus of claim 43, further comprising: means for receiving a paging message; and means for transmitting a response to the paging message, wherein the response includes an indication of timing of the scanning during the second operational state, the third operational state, or the second and third operational states.

60. The apparatus of claim 43, further comprising: means for receiving paging messages from a plurality of nodes within a defined period of time; and means for transmitting a single response to the paging messages.

61. The apparatus of claim 60, wherein the transmission of the single response comprises broadcasting the single response over a channel that is common to the plurality of nodes.

62. The apparatus of claim 60, wherein a length of a preamble of the single response is based on relative scanning period times associated with the plurality of nodes.

63. The apparatus of claim 43, wherein at least one of the first duty cycle, the second duty cycle, or the third duty cycle is based on a node type.

64. A computer-program product for wireless communication, comprising: non-transitory computer-readable medium comprising codes executable to: scan a channel according to a first duty cycle during a first operational state; scan the channel according to a second duty cycle during a second operational state, wherein the second duty cycle is lower than the first duty cycle; and scan the channel according to a third duty cycle during a third operational state, wherein the third duty cycle is lower than the second duty cycle; and wherein the channel scanning according to the second duty cycle comprises periodically scanning at times based on a first time interval, the channel scanning according to the third duty cycle comprises periodically scanning at times based on a second time interval, and the second time interval is longer than the first time interval.

65. A headset for wireless communication, comprising: a receiver configured to: scan a channel according to a first duty cycle during a first operational state; scan the channel according to a second duty cycle during a second operational state, wherein the second duty cycle is lower than the first duty cycle; and scan the channel according to a third duty cycle during a third operational state, wherein the third duty cycle is lower than the second duty cycle; and wherein the channel scanning according to the second duty cycle comprises periodically scanning at times based on a first time interval, the channel scanning according to the third duty cycle comprises periodically scanning at times based on a second time interval, and the second time interval is longer than the first time interval; and a transducer configured to provide an audio output based on data received via the receiver.

66. A watch for wireless communication, comprising: a receiver configured to: scan a channel according to a first duty cycle during a first operational state; scan the channel according to a second duty cycle during a second operational state, wherein the second duty cycle is lower than the first duty cycle; and scan the channel according to a third duty cycle during a third operational state, wherein the third duty cycle is lower than the second duty cycle; and wherein the channel scanning according to the second duty cycle comprises periodically scanning at times based on a first time interval, the channel scanning according to the third duty cycle comprises periodically scanning at times based on a second time interval, and the second time interval is longer than the first time interval; and a user interface configured to provide an indication based on data received via the receiver.

67. A sensing device for wireless communication, comprising: a receiver configured to: scan a channel according to a first duty cycle during a first operational state; scan the channel according to a second duty cycle during a second operational state, wherein the second duty cycle is lower than the first duty cycle; and scan the channel according to a third duty cycle during a third operational state, wherein the third duty cycle is lower than the second duty cycle; and wherein the channel scanning according to the second duty cycle comprises periodically scanning at times based on a first time interval, the channel scanning according to the third duty cycle comprises periodically scanning at times based on a second time interval, and the second time interval is longer than the first time interval; and a sensor configured to provide data to be transmitted during at least one of: the first operational state, the second operational state, or the third operational state.

* * * * *